United States Patent [19]
Mitsuhashi et al.

[11] Patent Number: 5,876,847
[45] Date of Patent: Mar. 2, 1999

[54] REUSABLE PRINTING SHEET

[75] Inventors: Hiroyuki Mitsuhashi, Otokuni-gun; Kenji Kohno, Ibaraki; Kazushi Miyata, Mishima-gun, all of Japan

[73] Assignee: Hitachi Maxell, Ltd., Asaka-fu, Japan

[21] Appl. No.: 509,900

[22] Filed: Aug. 1, 1995

[30] Foreign Application Priority Data

Aug. 1, 1994 [JP] Japan .................................... 6-200156

[51] Int. Cl.$^6$ .............................. G03G 5/00; B32B 15/08
[52] U.S. Cl. ....................... 428/336; 428/411.1; 428/457; 428/922; 430/33; 430/62
[58] Field of Search ................................. 430/31, 33, 60, 430/62; 428/922, 938, 423.1, 423.7, 425.8, 425.9, 457, 458, 336, 411.1

[56] References Cited

U.S. PATENT DOCUMENTS

| | | | |
|---|---|---|---|
| 4,480,003 | 10/1984 | Edwards et al. | 428/329 |
| 4,824,725 | 4/1989 | Thoese | 428/336 |
| 4,997,697 | 3/1991 | Malhortra | 428/199 |
| 5,104,731 | 4/1992 | Gager | 428/323 |
| 5,385,796 | 1/1995 | Spiewak | 430/64 |
| 5,484,694 | 1/1996 | Lelental et al. | 430/530 |

FOREIGN PATENT DOCUMENTS

| | | |
|---|---|---|
| 0 274662 | 7/1988 | European Pat. Off. . |
| 0 463400 | 1/1992 | European Pat. Off. . |
| 0 546750 | 6/1993 | European Pat. Off. . |
| 0 554588 | 8/1993 | European Pat. Off. . |
| 0 601502 | 6/1994 | European Pat. Off. . |
| 0 602713 | 6/1994 | European Pat. Off. . |
| 0 603431 | 6/1994 | European Pat. Off. . |
| 0 0264 | 4/1979 | WIPO . |
| 93 01854 | 3/1994 | WIPO . |

*Primary Examiner*—Paul J. Thibodeau
*Assistant Examiner*—D Lawrence Tarazano
*Attorney, Agent, or Firm*—Birch, Stewart, Kolasch & Birch, LLP

[57] ABSTRACT

A coated substrate having a material substrate, and a coating composition fixed to a surface of the material substrate as a surface layer, the surface layer containing a hydrophilic resin which swells water but is not washed off by water, and which is solid in air at ambient temperatures that are encountered when said coated substrate is functioning as a reusable printing sheet and from which surface layer prior printing deposits can be readily removed, and when which the coated substrate has a surface resistivity of to $10^5$ to $10^{13}$ $\Omega/\square$ at 25° C., 50% RH after being dipped in water for 5 minutes and dried with a hot air of 60° to 90° C. for 5 minutes.

5 Claims, No Drawings

REUSABLE PRINTING SHEET

BACKGROUND OF THE INVENTION

1. Field of the Invention

The present invention relates to a reusable printing sheet from which prior printing deposits are readily removable. In particular, the present invention relates to a surface coating fixed to a substrate sheet which is used in an office automation equipment such as a printer of a computer or a word processor, a copier, and so on, and from a surface of which, deposits such as a printing ink or a toner are readily removed by washing with water so that the sheet can be repeatedly cleaned and used.

2. Description of the Related Art

Office automation sheets such as printing papers, copying papers, overhead projector (OHP) sheets are used in a large volume for printing characters or drawings by a xerographic copier, a laser printer, an ink jet printer, and so on. In these years, the amount of color printing is increasing. Accordingly, the volume of the office automation sheets increases year by year.

Most of the office automation sheets are discarded after use, and cause environmental problems or waste of natural resources. To solve such problems, it is preferable to recycle the once used office automation sheets, erase the printed characters or drawings, and reuse the sheets.

However, in many cases, a toner or an ink to be printed by the xerographic copier or the printer is insoluble in water, so that the removal of the toner or ink from the sheet is difficult. If the toner or ink is water-soluble, it is not easy to completely remove it from the sheet and to reuse the cleaned sheet. If an organic solvent is used to erase the printed characters or drawings, it has an adverse effect on human bodies and environment.

As one of the ways to solve such problems, EP-A-601-502 (corresponding to JP-A-6-222604) disclose an office automation sheet having a surface coating comprising a hydrophilic resin which swells in water but is not washed off by water and is a solid in air at ambient temperatures. The disclosed office automation sheet is useful, but still unsatisfactory, since its printing property with the toner or ink, its transportability in the copying or printing machine, and its easy handling property may be deteriorated after recycling.

SUMMARY OF THE INVENTION

An object of the present invention is to provide a reusable office automation sheet having a surface layer comprising a hydrophilic resin which is (1) a solid in air at ambient temperatures and (2) swells with water but is not washed off by water, and which automation sheet can maintain a printing property, transportability and easy handling after recycling.

According to the present invention, there is provided a coated substrate comprising a material substrate, and a coating composition fixed to a surface of said material substrate as a surface layer, said surface layer comprising a hydrophilic resin which swells in water but is not washed off by water, and that is solid in air at ambient temperatures that are encountered when said coated substrate is functioning as a reusable printing sheet and from which surface layer prior printing deposits (e.g., printing ink or toner) can be readily removed, wherein said coated substrate has a surface resistivity of $10^5$ to $10^{13}$ $\Omega/\square$ at 25° C., 50% RH after being dipped in water for 5 minutes and dried with a hot air of 60° to 90° C. for 5 minutes.

When office automation sheets have the above properties, they do not stick each other as a result of electrostatic charge during printing with xerographic copiers. Thus, insertion failures of the sheets or jamming of the sheets can be prevented, and handling of plural sheets is very easy.

DETAILED DESCRIPTION OF THE INVENTION

In the present invention, the coated substrate has a surface resistivity of $10^5$ to $10^{13}$ $\Omega/\square$ at 25° C., 50% RH after being dipped in water for 5 minutes and dried with a hot air of 60° to 900° C. for 5 minutes. When the surface resistivity is larger than $10^{13}$ $\Omega/\square$, an effect of preventing electrostatic charge is low, so that the intended effect of the present invention is not achieved.

When the office automation sheet having the surface coating layer from which the deposits are readily removed and which has the surface resistivity of less than $10^5$ $\Omega/\square$ is printed by the xerographic copier, a uniform printing quality is not obtained, that is, an excessive amount of the toner is deposited on the sheet surface, or an insufficient amount of the toner is deposited in a solid print part.

In view of the deposition of the toner on the sheet surface, the surface resistivity is preferably from $10^9$ to $10^{12}$ $\Omega/\square$.

To make the printing property, transportability and handling of the sheet good in the first printing process, the surface resistivity is preferably in the range of $10^5$ to $10^{13}$ $\Omega/\square$.

In some applications, preferably the surface coating of the present invention has good transparency. In such case, the coating has a transmission of at least 70% with a light having a wavelength of 550 nm.

In the applications where the transparency is required such as the OHP sheet, if the transparency of the coating is decreased by water, the sheet would have some problem in use. Then, after being dipped in water, the decrease of a transmission with the light having the wavelength of 550 nm is 30% or less in comparison to the transmittance before being dipped in water.

A thickness of the surface coating of the present invention is not critical. Preferably, the thickness of the surface coating is at least 0.05 $\mu$m for sufficient swellability. In particular, to achieve the good printing property with a color toner or an aqueous ink, the thickness is at least 0.5 $\mu$m. When the thickness of the surface coating is too large, the coating may be damaged when the ink or other deposits are removed with water. Therefore, the thickness of the surface coating is preferably 50 $\mu$m or less, more preferably 30 $\mu$m or less.

The surface coating and an antistatic layer which will be explained below, or the antistatic layer and the substrate material have good adhesion to each other or peeling resistance, so that they are not peeled off. To this end, the surface coating or the antistatic layer has preferably a rank of "5" or larger, more preferably a rank of "8" or larger in the chess board (GOBANME) test according to JIS K 5400.

In the present invention, the surface resistivity may be adjusted in the above defined range by any method. For example, a material which has an antistatic property and is hardly washed off by water, such as a conductive power or an antistatic agent is compounded in the surface coating composition, or an antistatic layer is formed between the substrate material and the surface coating.

The formation of the antistatic layer between the substrate material and the surface coating is effective to control the surface resistivity, since the properties of the surface coating are not deteriorated, or the antistatic material is not dissipated from the surface.

Hereinafter, the office automation sheet of the present invention will be explained in connection with the sheet having the antistatic layer as an under coat.

The antistatic layer may be formed by any of the known conventional methods. For example, a conductive coating composition comprising a conductive powder is coated on the substrate material, or a coating composition in which a polymeric antistatic agent or a conductive polymer is dissolved is coated on the substrate material. When the antistatic layer is formed, the electrical charge on the office automation sheet is effectively suppressed.

Preferably, the antistatic layer has sufficient heat resistance, so that the antistatic effect of the layer is not deteriorated by the heat applied on the sheet in a printing step in the xerographic printing or laser printing so as to maintain the antistatic property of the office automation sheet in repeated depositions and removals of ink.

Preferably, the antistatic layer is not dissolved in water and does not absorb water, or if it absorbs water, it can restore the antistatic property after drying, when the ink is repeatedly removed from the surface coating. In water used for removing the ink and so on, an electrolyte, a polymer, a surfactant, or an organic solvent such as an alcohol may be contained.

In a preferred embodiment, the antistatic layer is formed by coating a conductive coating composition which has been prepared by dispersing the conductive powder and a binder resin in a solvent, and coating it on the substrate material.

Preferred examples of the conductive powder material are zinc oxide, barium sulfate, aluminum borate, titanium oxide, tin oxide, titanium black, potassium titanate, and so on. Examples of the binder resin are acrylic resins, polyester resins, polyurethane resins, polyvinyl chloride resins, and so on. Examples of the solvent are water, alcohols (e.g. methanol, ethanol, isopropanol, butanol, etc.), ketones (e.g. acetone, methyl ethyl ketone, methyl isobutyl ketone, cyclohexanone, etc.), toluene, ethylene glycol, diethylene glycol methyl cellosolve, ethyl cellosolve, esters (e.g. methyl acetate, ethyl acetate, butyl acetate, etc.), ethers (e.g. tetrahydrofuran, dimethyl ether, diethyl ether, etc.), amides (e.g. dimethylformamide, dimethylacetamide, etc.), dimethylsulfoxide, dioxane, hexane, N-methylpyrrolidone, and so on. They may be used independently or as their mixture.

When the antistatic layer comprises the polymeric antistatic agent, the polymeric antistatic agent is dissolved in an organic solvent to obtain a paint, and the paint is coated on the substrate material.

Examples of the polymeric antistatic agent are polymers of a quaternary ammonium salt of acrylic acid or methacrylic acid; or a monomer having a tertiary amine group (e.g. N,N-dimethylacrylamide, N-acrylylglycineamide, N-isopropylacrylamide, N,N-dimethylaminopropylacrylamide, vinylpyrrolidone, N,N-dimethylaminoethyl acrylate, N,N-dimethylaminoethyl methacrylate, allylamine, etc.).

When the antistatic layer comprises the conductive polymer, the conductive polymer is dissolved in water or an organic solvent to obtain a paint, and the paint is coated on the substrate material. Examples of the conductive polymer are polyaniline, polyacetylene, polyparaphenylene, polypyrrole, polythiophene, polyvinyl carbazole, and so on. In the polymeric antistatic agent or the conductive polymer, other general resin or a dopant may be mixed.

Examples of the solvent in which the polymeric antistatic agent or the conductive polymer is dissolved are water, alcohols (e.g. methanol, ethanol, isopropanol, butanol, etc.), ketones (e.g. acetone, methyl ethyl ketone, methyl isobutyl ketone, cyclohexanone, etc.), toluene, ethylene glycol, diethylene glycol methyl cellosolve, ethyl cellosolve, esters (e.g. methyl acetate, ethyl acetate, butyl acetate, etc.), ethers (e.g. tetrahydrofuran, dimethyl ether, diethyl ether, etc.), amides (e.g. dimethylformamide, dimethylacetamide, etc.), dimethylsulfoxide, dioxane, hexane, N-methylpyrrolidone, and so on. They may be used independently or as a mixture thereof.

Alternatively, the antistatic layer may be made of a metal vapor deposition film of, for example, aluminum, gold, silver, copper, iron, cobalt, nickel, titanium, platinum, molybdenum, tungsten, etc.

The surface coating which is formed on the antistatic layer may be formed by coating a solution of the hydrophilic resin which swells with water on the antistatic layer, and drying it.

Examples of the hydrophilic resin which swells with water are homo- or copolymers of acrylic acid, methacrylic acid, vinyl alcohol, hydroxyethyl methacrylate, dihydroxypropyl methacrylate, acrylamide-2-methylpropanesulfonic acid, acrylamide, methacrylamide, N,N-dimethylacrylamide, N,N-diethylacrylamide, N-acrylylglycineamide, N-isopropylacrylamide, N,N-dimethylaminopropylacrylamide, vinylpyrrolidone, N,N-dimethylaminoethyl acrylate, N,N-dimethylaminoethyl methacrylate, allylamine, their salts, quaternary derivatives of the amino compounds; polyethylene glycol and cellulose hydroxyl groups of which are substituted by one or more of a methoxy group, an ethoxy group, a propoxy group, a hydroxyethoxy group, a hydroxypropoxy group, etc.; copolymers of the above monomer or monomers with at least one other monomer; and so on.

The surface coating comprising such hydrophilic resin should not be washed away (washed off) with water, so that the office automation sheet can be repeatedly used. To this end, the hydrophilic resin has preferably a gel content, which is a ratio of unwashed away (washed off) components, of at least 50%, more preferably at least 70%. When the gel content is in this range, scratch resistance and water resistance can be imparted to the coating to some extent.

In some cases, it is effective to crosslink the hydrophilic resin. Examples of a functional group for crosslinking are an epoxy group, an isocyanate group, a double bond, a sulfoxyl group, a phosphoxyl group, a carboxyl group, an acid anhydride, an aldehyde group, an oxyazoline, a hydroxyl group, an amino group, an amide group, and the like. The functional group may be present in a crosslinking agent or the hydrophilic resin. Specific examples of the crosslinking agent are an epoxy crosslinking agent, an isocylanate crosslinking agent, tannic acid, glyoxal, methylol-melamine resin, urea-formalin resin, and so on. The hydrophilic resin may be crosslinked by radiation.

Examples of the solvent in which the hydrophilic resin is dissolved are water, alcohols (e.g. methanol, ethanol, isopropanol, butanol, etc.), ketones (e.g. acetone, methyl ethyl ketone, methyl isobutyl ketone, cyclohexanone, etc.), toluene, ethylene glycol, diethylene glycol methyl cellosolve, ethyl cellosolve, butyl cellosolve, esters (e.g. methyl acetate, ethyl acetate, butyl acetate, etc.), ethers (e.g. tetrahydrofuran, dimethyl ether, diethyl ether, etc.), amides (e.g. dimethylformamide, dimethylacetamide, etc.), dimethylsulfoxide, dioxane, hexane, N-methylpyrrolidone, and so on. They may be used independently or as a mixture thereof.

The surface coating and the antistatic layer may be formed on either one or both of the surfaces of the substrate material.

To improve various properties of the coated substrate, materials other than the hydrophilic resin may be used in combination with the hydrophilic resin. For example, inorganic particles, organic particles, a plasticizer, an antifoaming agent, a lubricant, a dye, a pigment, a dispersant, a hydrophobic resin and so one can be used, if desired.

Alternatively, the material having the antistatic property such as the conductive powder or the antistatic agent can be compounded in the surface coating composition.

EXAMPLES

The present invention will be illustrated by the following examples, which will not limit the scope of the present invention in any way.

Example 1

An electricaly conductive composition A was prepared by mixing the following components homogeneously:

| Component | Wt. parts |
|---|---|
| Electrically conductive paint (ELECOM P-3530 manufactured by SHOKUBAI KASEI Ind. Ltd.) | 33.4 |
| Cyclohexanone | 33.3 |
| Toluene | 33.3 |

Separately, a composition of the following components was charged in a flask equipped with a condenser and heated and reacted at a temperature of 70° to 800° C. in a nitrogen stream for 10 hours to obtain a solution of a hydrophilic resin A in isopropanol:

| Component | Wt. parts |
|---|---|
| Methacrylic acid | 5 |
| Acrylic acid | 20 |
| 2-Hydroxyethyl methacrylate | 30 |
| Azobisisobutyronitrile | 0.48 |
| Isopropanol | 220 |

To the polymer solution, a solution of sodium hydroxide (3.7 wt. parts) in water (242 wt. parts) was added to neutralize the polymer to obtain a 10 wt. % solution of the resin A.

To the 10 wt. % solution of the resin A, an epoxy crosslinking agent (TETRAD-C manufactured by Mitsubishi Gas Kagaku Co., Ltd.) (2.75 wt. parts) was added and stirred to obtain a homogeneous paint (1).

On a polyethylene terephthalate film having a thickness of 100 μm, the conductive composition A was coated at a dry thickness of 0.3 μm and dried to form an antistatic layer. Then, on the antistatic layer, the paint (1) was coated at a dry thickness of 1.5 μm and dried, followed by heating at 110° C. for 5 hours to crosslink the resin A, whereby a surface coating from which deposits are readily removed was formed on the antistatic layer to obtain an OHP sheet.

Example 2

An electrically conductive composition B was prepared by mixing the following components homogeneously:

| Component | Wt. parts |
|---|---|
| Electrically conductive paint (SHINTRON C-4402 manufactured by SHINTO PAINT Co. Ltd.) | 50 |
| Methyl isobutyl ketone | 10 |
| Toluene | 10 |
| Epoxy crosslinking agent (TETRAD-C) (manufactured by Mitsubishi Gas Kagaku Co., Ltd.) | 1.75 |

On a polyethylene terephthalate film having a thickness of 100 μm, the conductive composition B was coated at a dry thickness of 0.3 μm and dried to form an antistatic layer. Then, on the antistatic layer, the paint (1) prepared in Example 1 was coated at a dry thickness of 1.5 μm and dried, followed by heating at 110° C. for 5 hours to crosslink the resin A, whereby a surface coating from which deposits are readily removed was formed on the antistatic layer to obtain an OHP sheet.

Example 3

An electrically conductive composition C was prepared by mixing the following components homogeneously:

| Component | Wt. parts |
|---|---|
| Polyaniline | 1.3 |
| p-Toluenesulfonic acid | 1.6 |
| Polyester | 1.3 |
| N-methylpyrrolidone | 95.8 |

On a polyethylene terephthalate film having a thickness of 100 μm, the conductive composition C was coated at a dry thickness of 0.1 μm and dried to form an antistatic layer. Then, on the antistatic layer, the paint (1) prepared in Example 1 was coated at a dry thickness of 1.5 μm and dried, followed by heating at 110° C. for 5 hours to crosslink the resin A, whereby a surface coating from which deposits are readily removed was formed on the antistatic layer to obtain an OHP sheet.

Example 4

On a commercially available polyethylene terephthalate film having a polymeric antistatic agent layer (Lumirror U94 manufactured by TORAY Co., Ltd.), the paint (1) prepared in Example 1 was coated at a dry thickness of 1.5 μm and dried, followed by heating at 110° C. for 5 hours to crosslink the resin A, whereby a surface coating from which deposits are readily removed was formed on the antistatic layer to obtain an OHP sheet.

Example 5

On a commercially available polyethylene terephthalate film having a polymeric antistatic agent layer (Lumirror U 94 manufactured by TORAY Co., Ltd.), the paint (1) prepared in Example 1 was coated at a dry thickness of 0.5 μm and dried, followed by heating at 110° C. for 5 hours to crosslink the resin A, whereby a surface coating from which deposits are readily removed was formed on the antistatic layer to obtain an OHP sheet.

Example 6

On a commercially available opaque polyethylene terephthalate sheet having a polymeric antistatic agent layer (Crisper G2323 manufactured by TOYOBO Co., Ltd.), the paint (1) prepared in Example 1 was coated at a dry thickness of 1.5 μm and dried, followed by heating at 110° C. for 5 hours to crosslink the resin A, whereby a surface coating from which deposits are readily removed was formed on the antistatic layer to obtain an OHP sheet.

Example 7

A composition of the following components was charged in a flask equipped with a condenser and heated at a temperature of 70° to 80° C. in a nitrogen stream for 10 hours to obtain a solution of a hydrophilic resin B in isopropanol:

| Component | Wt. parts |
|---|---|
| Methacrylic acid | 50 |
| 2-Hydroxyethyl methacrylate | 75.5 |
| Azobisisobutyronitrile | 0.95 |
| Isopropanol | 741 |

To the polymer solution (133 wt. parts), an epoxy crosslinking agent (EX-920 manufactured by Nagase Chemical Co., Ltd.) (1 wt. parts) was added and stirred to obtain a homogeneous paint (2).

On a polyethylene terephthalate film having a thickness of 100 μm, the conductive composition A was coated at a dry thickness of 0.3 μm and dried to form an antistatic layer. Then, on the antistatic layer, the paint (2) was coated at a dry thickness of 1.5 μm and dried, followed by heating at 110° C. for 5 hours to crosslink the resin B, whereby a surface coating from which deposits are readily removed was formed on the antistatic layer to obtain an OHP sheet.

Example 8

The solution of the resin A in isopropanol as prepared in Example 1 (10 wt. parts) and an epoxy crosslinking agent (SR-GLG manufactured by Sakamoto Chemical Co., Ltd.) (0.1 wt. part) were homogeneously mixed to obtain a paint (3).

On a polyethylene terephthalate film having a thickness of 100 μm, the conductive composition A was coated at a dry thickness of 0.3 μm and dried to form an antistatic layer. Then, on the antistatic layer, the paint (3) was coated at a dry thickness of 20 μm and dried, followed by heating at 110° C. for 5 hours to crosslink the resin A, whereby a surface coating from which deposits are readily removed was formed on the antistatic layer to obtain an OHP sheet.

Comparative Example

In the same manner as in Example 1 except that no antistatic layer was formed, an OHP sheet was produced.

With each of the OHP sheets produced in Examples and Comparative Example, the following properties were measured. In the test in which printing was required, a xerographic copier (NP 5060 manufactured by Canon) was used.

Removability of Toner Ink

After an OHP sheet is dipped in a 1 wt. % aqueous solution of $NaHCO_3$ for 20 minutes, a surface of the sheet is wiped with a sponge in running water to evaluate the removability of toner ink and ranked as "++" (removed with running water only) and "+" (completely removed with gentle wiping).

Repeated Removability of Toner Ink

After carrying out the above test of removability of toner ink, moisture is thoroughly removed by a drier, an image is printed on the sheet, and then the toner ink was removed. These steps are repeated and the final number of repetitions after which the ink toner is completely removed is recorded.

Surface Resistivity

A surface resistivity of an OHP sheet is measured at 25° C., 50% RH using a resistance meter (4329A manufactured by Heulet Packard).

Surface Resistivity after Water Dipping

An OHIP sheet is dipped in water for 5 minutes, and dried with a hot air of 80° C. Thereafter, a surface resistivity of the OHP sheet is measured at 25° C., 50% RH in the same manner as above.

Transportability

As a measure of the transportability, the number of sheets which are clogged in the copier when 10 sheets are printed is counted.

Light transmission

Using a UV-visible light spectrophotometer (200-20 Type Double Beam Spectrophotometer manufactured by Hitachi), a light transmission at a wavelength of 550 nm is measured.

Light Transmission after Water Dipping

An OHP sheet is dipped in water for 5 minutes, and dried with a hot air of 80° C. for 5 minutes. Thereafter, a light transmission is measured in the same manner as above.

The results are shown in the Table.

As seen from the results of the Table, the office automation sheets (OHP sheets) obtained in Examples 1–8 had the surface resistivity in the range of $10^5$ to $10^{13}$ Ω/□ even after the dipping in water, so that they do not stick to each other and are easily handled in the form of a bundle of plural sheets.

TABLE

| Example No. | 1 | 2 | 3 | 4 | 5 | 6 | 7 | 8 | Comp. |
|---|---|---|---|---|---|---|---|---|---|
| Removability of toner ink | ++ | ++ | ++ | ++ | + | ++ | ++ | + | ++ |
| Repeated removability of toner ink | 10–20 | 10–20 | 10–20 | 10–20 | 5–15 | 10–20 | 5–15 | 5–10 | 10–20 |
| Surface resistivity | $5.6 \times 10^6$ | $2.9 \times 10^7$ | $2.0 \times 10^5$ | $3.0 \times 10^{11}$ | $2.2 \times 10^{11}$ | $2.8 \times 10^{12}$ | $1.3 \times 10^7$ | $2.1 \times 10^8$ | Unmeasurable |
| Surface resistivity after water dipping | $5.5 \times 10^6$ | $8.6 \times 10^7$ | $3.4 \times 10^5$ | $3.3 \times 10^{11}$ | $2.5 \times 10^{11}$ | $2.8 \times 10^{12}$ | $1.4 \times 10^7$ | $2.0 \times 10^8$ | ($>10^{13}$) |
| Transportability | 0 | 0 | 0 | 0 | 0 | 0 | 0 | 0 | 3 |

TABLE-continued

| Example No. | 1 | 2 | 3 | 4 | 5 | 6 | 7 | 8 | Comp. |
|---|---|---|---|---|---|---|---|---|---|
| Light transmittance (%) | 85 | 86 | 83 | 89 | 89 | — | 89 | 88 | 86 |
| Light transmittance after water dipping (%) | 84 | 83 | 80 | 89 | 85 | — | 70 | 86 | 84 |

What is claimed is:

1. A coated substrate comprising:

a material substrate having an antistatic layer and a surface layer fixed to a surface thereof, wherein said surface layer comprises a hydrophilic resin which swells in water but is not washed off said substrate by water, and which is solid in air and from which printing can be removed by washing with water, wherein the anti-static layer comprises a dispersed conductive powder in a polymer matrix, a polymeric anti-static agent, or a conductive polymer, and said anti-static layer is present between the substrate material and the surface layer, wherein said surface layer or said antistatic layer has a rank of at least "5" in the cross cut test according to JIS K 5400, wherein said coated substrate has a surface resistivity of $10^5$ to $10^{13}$ Ω/□ before being dipped in water, and wherein said coated substrate has a surface resistivity of $10^5$ to $10^{13}$ Ω/□ at 25° C., 50% RH after being dipped in water for 5 minutes and dried with hot air of 60° to 90° C. for 5 minutes.

2. The coated substrate according to claim 1, which has a light transmission of at least 70% with a light having a wavelength of 550 nm.

3. The coated substrate according to claim 1, wherein a decrease of the light transmission with a light having a wavelength of 550 nm is 30% or less after being dipped in water.

4. The coated substrate according to claim 1, wherein the thickness of said surface layer is from 0.05 μm to 50 μm.

5. A coated substrate comprising:

a material substrate having an antistatic layer and a surface layer fixed to a surface thereof, wherein said surface layer comprises a hydrophilic resin which swells in water but is not washed off said substrate by water, and which is solid in air and from which printing can be removed by washing with water, wherein the antistatic layer is present between the substrate material and the surface layer and comprises a metal vapor deposit film, and wherein said surface layer or said antistatic layer has a rank of at least "5" in the cross cut test according to JIS K 5400, wherein said coated substrate has a surface resistivity of $10^5$ to $10^{13}$ Ω/□ before being dipped in water, and wherein said coated substrate has a surface resistivity of $10^5$ to $10^{13}$ Ω/□ at 25° C., 50% RH after being dipped in water for 5 minutes and dried with hot air of 60° to 90° C. for 5 minutes.

* * * * *